UNITED STATES PATENT OFFICE 2,448,246

ALKENYL ESTERS OF ALKENOXY-SUBSTITUTED CARBOXYLIC ACIDS AND POLYMERS THEREOF

Robert S. Barker, Oakland, and Lynwood N. Whitehill, Berkeley, Calif., assignors to Shell Development Company, San Francisco, Calif., a corporation of Delaware No Drawing. Application April 26, 1944, Serial No. 532,889

6 Claims. (Cl. 260—78.3)

This invention relates to alkenyl esters of alkenoxy-substituted acids in which the alkenyl and alkenoxy groups are of different character, to the polymerization and co-polymerization thereof and to the resulting polymers and co-polymers.

As the polymerization of a polymerizable unsaturated compound progresses the percentage of monomer decreases and the percentage of polymer increases. In the case of compounds containing in the molecule two or more polymerizable unsaturated carbon-to-carbon linkages unconjugated with respect to carbon, the polymer first formed is fusible and soluble in many common organic solvents. The structure of the polymer molecule in this stage is presumably substantially linear. The polymer in this stage is soluble in the corresponding monomer and usually is soluble also in the monomer of other polymerizable unsaturated compounds. It can usually be separated from its solution with monomer by precipitation with selected liquids and by fractional distillation. As the polymerization of such a compound progresses further, cross-linking increases and more and more of the polymer has a cross-linked or three-dimensional structure as distinguished from the earlier produced linear structure. As cross-linking increases the general solubility of the polymer decreases and the monomer/polymer mixture may become a gel. Continued polymerization converts more of the residual monomer to polymer and also further increases cross-linking, further reducing solubility and fusibility, i. e. capability of being rendered plastic by heat without substantial decomposition or degradation. Eventually substantially all of the material is converted to a condition of infusibility and insolubility in most common solvents.

In the case of the polymerization of compounds having two unconjugated unsaturated groups of substantially equal polymerizability great difficulties have been experienced in obtaining infusible, insoluble, solid, resinous material, free from imperfections such as cracks. It is now believed that gel-formation occurs relatively early in the polymerization of such compounds. The gel first formed, while rigid, is relatively weak and is readily fractured by the contraction accompanying subsequent polymerization.

It has now been discovered that improved resinous solids can be obtained by the polymerization of certain compounds having two or more unconjugated unsaturated groups of substantially different polymerizability.

An object of the present invention is the production of compounds having improved polymerization characteristics. Another object is to provide compounds which can be polymerized and co-polymerized to insoluble, infusible solids substantially free from imperfections such as cracks. Another object is to provide new unsaturated compounds. Another object is to provide for the polymerization and co-polymerization of a new group of unsaturated compounds. Another object is to provide new polymers and co-polymers. Other objects will be apparent from the description of the invention given hereinafter.

These objects are accomplished in accordance with the present invention by alkenyl esters of alkenoxy-substituted carboxylic acids in which the alkenyl and alkenoxy groups are characterized by fundamental structural differences, and as well by different rates of polymerization. The new compounds are ethers of real or hypothetical unsaturated alcohols with esters of different real or hypothetical unsaturated alcohols with hydroxy carboxylic acids. Preferred compounds are those in which one of the aforesaid unsaturated alcohols is a vinyl-type alcohol and the other is an alcohol having an unsaturated carbon-to-carbon linkage of aliphatic character between two carbon atoms, one of which is directly attached to a saturated carbon atom to which is attached an alcoholic hydroxyl group. An important group of the new compounds may be represented by the general structural formula

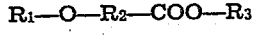

$$R_1\text{—O—}R_2\text{—COO—}R_3$$

wherein $R_2$ is a divalent organic radical, preferably a divalent hydrocarbon radical, which may or may not be substituted by halogen, hydroxy, alkoxy or like groups, and $R_1$ and $R_3$ are different polymerizable unsaturated organic radicals, at least one being a vinyl-type radical, the other being a radical of an alcohol having an unsaturated linkage of aliphatic character between two carbon atoms, one of which is directly attached to a saturated carbon atom to which is directly attached an alcoholic hydroxyl group.

Examples of divalent aliphatic hydrocarbon radicals are methylene, ethylene, ethylidene, propylene, propylidene, tetramethylene, butylidene, methyl ethylene, ethyl ethylene, pentamethylene, amylidene, methyl butylene, ethyl propylene, propyl ethylene, hexylene, decamethylene, phenylene, cyclohexylene, cyclopentylene, etc. Many other radicals are suitable. The radicals may be aliphatic, cycloaliphatic or aromatic, and may be saturated or unsaturated. Saturated open-chain aliphatic hydrocarbon radicals of not more than 10 carbon atoms are preferred.

Vinyl-type radicals are radicals of vinyl-type alcohols, which are compounds having a double bond of aliphatic character between two carbon atoms, one of which is attached directly to an alcoholic hydroxyl group, as represented by the general formula

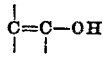

These vinyl-type alcohols may also be termed alpha,beta-olefinic alcohols because they contain the olefinic double bond between the carbon atoms in the alpha and beta positions in relation to the alpha-carbon atom to which the alcoholic hydroxyl group may be deemed to be directly linked.

Of the vinyl-type alcohols a preferred subgroup consists of compounds having a terminal methylene group attached directly by an olefinic double bond to a carbinol carbon atom, as represented by the general formula

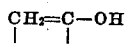

Examples of preferred vinyl-type alcohols are vinyl alcohol, isopropenol, buten-1-ol-2, etc. Examples of other vinyl-type alcohols are propen-1-ol-1, buten-1-ol-1, cyclohexen-1-ol-1, cyclopenten-1-ol-1, etc. Vinyl alcohol is the preferred specific alpha-unsaturated alcohol.

One group of compounds having an unsaturated linkage of aliphatic character between two carbon atoms, at least one of which is attached directly to a saturated carbon atom to which is attached directly an alcoholic hydroxyl group consists of alcohols in which the unsaturated linkage is a triple bond as represented by the general formula

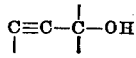

as exemplified by propargyl alcohol, pentyn-3-ol-2, 2-methyl-hexyn-3-ol-2, etc.

Another group consists of allyl-type alcohols. Allyl-type alcohols are unsaturated alcohols having an olefinic double bond of aliphatic character between two carbon atoms, one of which is attached directly to a saturated carbon atom which in turn is attached directly to an alcoholic hydroxyl group, as represented by the general structural formula

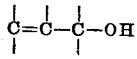

These allyl-type alcohols may be termed beta,-gamma-olefinic alcohols in that they contain the olefinic double bond between the carbon atoms in the beta and gamma positions in relation to the alpha-carbon atom to which is directly linked the alcoholic hydroxyl group.

Preferred allyl-type alcohols have a terminal methylene group attached directly by an olefinic double bond to a carbon atom which is attached directly to a saturated carbinol carbon atom, as represented by the formula

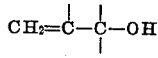

Allyl-type alcohols useful in the present invention preferably have not more than about eighteen carbon atoms and have at least one unsaturated carbon-to-carbon linkage for each six carbon atoms.

Representative examples of preferred allyl-type alcohols are the following: allyl alcohol, meth- allyl alcohol, ethallyl alcohol, chloroallyl alcohol, buten-1-ol-3, penten-1-ol-3, hexen-1-ol-3, 3-methyl-buten-1-ol-3, 3-methyl-penten-1-ol-3, 2-methyl-buten-1-ol-3, 2-methyl-penten-1-ol-3, 2,3-dimethyl-buten-1-ol-3, hepten-1-ol-3, 4-methyl-hexen-1-ol-3, 5-methyl-hexen-1-ol-3, 4,4'-dimethyl-penten-1-ol-3, octen-1-ol-3, 6-methyl-hepten-1-ol-3, 4-methyl-hepten-1-ol-3, 4,4'-dimethyl-hexen-1-ol-3, 3-phenyl-propen-1-ol-3, 3-tolyl-propen-1-ol-3, 3-xylyl-propen-1-ol-3, 4-phenyl-buten-1-ol-3, 4-tolyl-buten-1-ol-3, 4-xylyl-buten-1-ol-3, 3-naphthyl-propen-1-ol-3, 4-chloro-buten-1-ol-3, pentadien-1,4-ol-3, hexen-1-yn-5-ol-3, 2-methyl-penten-1-yn-4-ol-3, and 2,5-dimethyl-hexadien-1,5-ol-4. Other allyl-type alcohols are crotyl alcohol, tiglyl alcohol, 3-chloro-buten-2-ol-1, cinnamyl alcohol, hexadien-2,4-ol-1, hexadien-2,5-ol-1, butadien-2,3-ol-1, hexadien-3,5-ol-2, 2-methyl-hexen-2-ol-1, 2-methyl-penten-2-ol-1, 3,7-dimethyl-octadien-2,7-ol-1, cyclopenten-2-ol-1, cyclohexen-2-ol-1, etc. The foregoing examples taken as a whole show beta,-gamma- monoolefinic monohydric alcohols containing 3 to 13 carbon atoms and beta,gamma-monoolefinic aliphatic monohydric alcohols of 3 to 8 carbon atoms.

Representative examples of some of the compounds of the invention having the hereinbefore-designated general formula are:

Vinyl alloxy acetate
Vinyl methalloxy acetate
Vinyl chloroalloxy acetate
Vinyl crotoxy acetate
Vinyl propargoxy acetate
Vinyl alpha alloxy propionate
Vinyl alpha methalloxy propionate
Vinyl beta chloroalloxy propionate
Vinyl beta alloxy propionate
Vinyl beta methalloxy propionate
Vinyl alpha alloxy butyrate
Vinyl alpha methalloxy butyrate
Vinyl beta alloxy butyrate
Vinyl gamma alloxy butyrate
Vinyl gamma alloxy isobutyrate
Isopropenyl alloxy acetate
Isopropenyl methalloxy acetate
Isopropenyl beta chloroalloxy acetate
Isopropenyl alpha alloxy propionate
Isopropenyl alpha methalloxy propionate
Isopropenyl beta alloxy propionate
Isopropenyl alpha alloxy butyrate
Isopropenyl alpha methalloxy butyrate
Isopropenyl beta alloxy butyrate
(Buten-1-yl-2) alloxy acetate
Allyl ethenoxy acetate
Allyl alpha ethenoxy propionate
Allyl beta ethenoxy propionate
Allyl alpha ethenoxy butyrate
Allyl beta ethenoxy butyrate
Allyl isopropenoxy acetate
Allyl alpha isopropenoxy propionate
Allyl beta isopropenoxy propionate
Methallyl ethenoxy acetate
Methallyl alpha ethenoxy propionate
Methallyl beta ethenoxy propionate
Methallyl isopropenoxy acetate
Methallyl alpha isopropenoxy butyrate
Chloroallyl ethenoxy acetate
Chloroallyl beta ethenoxy propionate
Chloroallyl alphachloro beta ethenoxy butyrate
Propargyl isopropenoxy acetate, etc.

Examples of suitable alkenyl esters of monoalkenoxy-substituted dicarboxylic acids are divinyl alloxy malonate, divinyl methalloxy malonate, divinyl chloroalloxy malonate, divinyl monoalloxy succinate, divinyl mono alpha-alloxy glutarate, divinyl mono beta-alloxy glutarate, diallyl ethenoxy malonate, divinyl alloxy malonate, and diallyl ethenoxy malonate.

Another subgroup of suitable compounds consists of alkenyl esters of polyalkenoxy-substituted monocarboxylic acids. Those having two alkenoxy substituents may be represented by the general structural formula

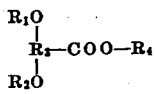

wherein $R_3$ is a trivalent organic radical, preferably a trivalent hydrocarbon radical which may or may not be substituted by halogen, hydroxy, alkoxy and like groups; and $R_4$ and one of the radicals $R_1$ and $R_2$ are different polymerizable unsaturated organic radicals, at least one being a vinyl-type radical, the other being a radical of an alcohol having an unsaturated linkage of aliphatic character between two carbon atoms, one of which is attached directly to a saturated carbon atom to which is attached directly an alcoholic hydroxyl group, the other of the radicals $R_1$ and $R_2$ being hydrogen or a monovalent organic radical, preferably a monovalent hydrocarbon radical which may or may not be substituted by halogen, hydroxy, alkoxy and like groups.

Examples of suitable alkenyl esters of polyalkenoxy-substituted monocarboxylic acids are vinyl dialloxy acetate, vinyl alpha,alpha-dialloxy propionate, vinyl beta,beta-dialloxy propionate, vinyl alpha,beta-dialloxy proprionate, vinyl alpha,alpha-dialloxy butyrate, isopropenyl dialloxy acetate, and allyl diethenoxy acetate.

Still other compounds within the scope of the invention are alkenyl esters of monoalkenoxy-substituted tri, tetra and higher polycarboxylic acids, alkenyl esters of tri, tetra and higher alkenyl-substituted monocarboxylic acids, alkenyl esters of di, tri and higher substituted di, tri and higher carboxylic acids, etc., wherein there are present in the molecule different alkenoxy and alkenyl ester groups as designated hereinbefore. In the case of esters of polycarboxylic acids, each of the carboxyl groups may be esterified by the same or different alkenyl radical, or less than all of the carboxyl groups may be esterified by an alkenyl radical or alkenyl radicals, the remainder being unesterified or esterified by alkyl, aryl or like radicals. The compounds may contain metallic salt groups, e. g. the alkali or alkaline earth metal salts.

The compounds of the invention can be produced by numerous methods of synthesis. One method comprises the production of the unsaturated ether acid which is then esterified. The ether acid can be produced by reacting an unsaturated halide upon a dialkali metal derivative of the hydroxy acid yielding the alkali metal salt of the unsaturated ether acid which can be converted to the free acid if desired by treatment with acid. For instance, allyl chloride can be reacted with glycolic acid in the presence of aqueous alkali to form alloxy acetic acid. Unsaturated ether acids can be produced by reacting an alkali metal derivative of an unsaturated alcohol with a halogen-substituted acid. For instance, sodium allylate may be reacted with chloroacetic acid to form alloxy acetic acid. Other methods of producing the unsaturated ether acids can be used. The unsaturated ether acids can be esterified with unsaturated alcohols by known or special methods. In some cases the esterification can be performed directly by reacting the acid with the alcohol, preferably in the presence of an esterification catalyst such as an alkali metal alcoholate, a strong mineral acid or the like. In other cases it is preferred to react an alkali metal derivative of the acid with the alcohol or with a halide of the alcohol or with an ester of the alcohol with a low-boiling acid. Another method comprises reacting the free acid upon an ester of the alcohol with a low-boiling acid, preferably in the presence of a catalyst such as mercuric sulfate. Another method comprises ester-exchange, involving an ester of the unsaturated ether acid with a lower alcohol, e. g. a lower saturated aliphatic alcohol, and an ester of an unsaturated alcohol with a lower acid, e. g. a lower saturated aliphatic acid, the reaction being preferably conducted in the presence of an esterification catalyst. Another method of producing the compounds of the invention comprises first producing an unsaturated ester of a substituted acid, e. g. a hydroxy-substituted, an alkali metalloxy-substituted or a halogen-substituted acid and subsequently converting the compound to the unsaturated ether of the unsaturated ester. The unsaturated esters of substituted acids can be produced by the direct esterification of the acid with the alcohol, by ester-exchange, by acid-exchange or by ester-interchange, in accordance with one or more of the above-disclosed processes or by other methods. The esters of the hydroxy-substituted acids can be etherified with unsaturated alcohols or, preferably, unsaturated alcohol derivatives such as unsaturated halides. The unsaturated esters of the alkali metalloxy-substituted acids can be reacted with the unsaturated alcohol or preferably unsaturated alcohol derivative such as an unsaturated halide to produce the ether ester. Unsaturated esters of halogen-substituted acids can be reacted with alkali metal derivatives of unsaturated alcohols.

In the case of compounds containing a vinyl ether or ester group other methods of synthesis, in addition to those described above, can be employed. Compounds in accordance with the invention having a vinyl ester group can be produced by reacting the unsaturated ether acid with acetylene in the presence of a mercuric salt such as mercuric sulfate. Compounds having a vinyl ether group may be produced by reacting acetylene upon the allyl-type ester of the hydroxy-substituted acid preferably in the presence of a basic catalyst. Another method comprises producing the vinyl ester of vinoxy-substituted carboxylic acids by reacting acetylene upon the hydroxy acid and subsequently subjecting the ether ester to ester-exchange or ester-interchange by reaction with an allyl-type alcohol or an allyl-type ester of a suitable acid, e. g. a lower saturated aliphatic acid.

Compounds of the invention may be produced by the dehydration, dehydrohalogenation or dehalogenation of suitable saturated compounds. For instance, disodium glycolate can be reacted with ethylene chlorohydrin to form the sodium derivative of the glycol ester of glycolic acid followed by etherification and subsequently by dehydration to the corresponding vinyl ester. The mono sodium derivative of ethylene glycol can be reacted with the halogen-substituted acid, or derivative thereof, followed by dehydration to the vinyl ether of the hydroxy acid, or derivative, which can then be esterified.

Another method of synthesis for the unsaturated esters of alkenoxy acetic acid comprises first producing an acetal of an unsaturated ether of ketene, e. g. an acetal of an alkenoxy ketene. Where the compound is an acetal with an unsaturated alcohol, reaction with water yields the unsaturated ester of the alkenoxy acetic acid. Acetals of substituted ketenes with saturated alcohols on reaction with water yield saturated esters, which may be converted to the unsaturated esters by ester-exchange or ester-interchange. Acetals with saturated alcohols may be reacted with unsaturated alcohols to give mixtures of products including the unsaturated esters.

Other methods of producing the compounds of the invention can be used.

Catalysts other than those named herein can be employed. Those catalysts and conditions which have been found to apply to esterification, etherification, etc. reactions in general can be applied to the production of the compounds of the present invention. Polymerization inhibitors may be required. Tannic acid is an effective inhibitor in reactions involving vinyl ester groups, although other inhibitors are satisfactory.

The monomeric compounds of the invention vary from low-viscosity liquids to solid substances. The lower members, i. e. the ethers of lower unsaturated alcohols with esters of different lower unsaturated alcohols with lower hydroxy carboxylic acids, are water-white liquids. The higher molecular weight members are solids.

The monomers can be used as plasticizers, tackifiers, and as intermediates in the synthesis of a large number of compounds. One of their most important uses is the production of the corresponding polymers.

The polymers are usually produced by the polymerization of the monomers, although in some cases the polymers of derivatives of the monomers can be first produced, followed by conversion to the desired polymers.

The monomeric compounds can be polymerized singly or in admixture with one another or with other polymerizable compounds, particularly compounds containing one or more unsaturated carbon-to-carbon linkages.

Typical co-polymerizable compounds are those containing in the molecule a single polymerizable olefinic linkage such as styrene, vinyl halides, vinylidene halides, vinyl esters of saturated monocarboxylic acids, methyl acrylate, methyl methacrylate, allyl halides, allyl esters of saturated monocarboxylic acids, etc. Another important group consists of unconjugated polymerizable compounds having in the molecule two or more non-conjugated polymerizable unsaturated linkages such as unsaturated aliphatic polyesters of saturated polybasic acids, polyesters of saturated polyhydric alcohols with unsaturated organic acids, and esters of unsaturated alcohols with unsaturated aliphatic acids. Other polymerizable unsaturated compounds are those containing in the molecule one or more polymerizable organic radicals and one or more inorganic radicals or elements as exemplified by the vinyl, allyl and methallyl esters of phosphoric acid and of the ortho acids of silicon, boron, etc. Another important group of co-polymerizable compounds consists of those having in the molecule two or more, preferably two, conjugated unsaturated polymerizable carbon-to-carbon linkages such as conjugated butadiene, conjugated chlorobutadiene, isoprene, the other conjugated pentadienes, the conjugated hexadienes, their homologues, analogues and suitable substitution products. Particularly valuable co-polymers are those of the compounds of the invention with one or more allyl-type polyesters of polycarboxylic acids, particularly allyl-type polyesters of aromatic polycarboxylic acids, e. g. diallyl phthalate and the like. Other valuable co-polymers are those with allyl-type polyesters of ethereal oxygen-containing polycarboxylic acids, e. g. diallyl diglycolate.

The compounds of the invention can be polymerized and co-polymerized by oxygen-containing polymerization catalysts. Benzoyl peroxide has been found satisfactory for this purpose. Other polymerization catalysts are acetyl peroxide, benzoyl acetyl peroxide, lauryl peroxide, dibutyryl peroxide, succinyl peroxide, sodium peroxide, barium peroxide, tertiary alkyl hydroperoxides, such as tertiary butyl hydroperoxide, peracetic acid, perphthalic acid, sodium peroxide, perborates, persulfates, ozone and oxygen. The compounds can be polymerized in the presence of their own peroxides, or of their ozonides. Another class of polymerization catalysts consists of the di(tertiary alkyl) peroxides, notably di(tertiary butyl) peroxide, as described and claimed in the co-pending application of Vaughan and Rust, Serial Number 481,052, filed March 29, 1943, now U. S. Patent 2,426,476, which is a continuation-in-part of their co-pending application, Serial Number 474,224, filed January 30, 1943, now U. S. Patent 2,395,523. Metals and metallic salts may be used as polymerization catalysts. If desired, mixtures of polymerization catalysts can be used, a suitable mixture being that of benzoyl peroxide and hydrogen peroxide. In some cases it may be desirable to conduct the polymerization in the concurrent presence of both a catalyst and an inhibitor of polymerization. The amount of peroxide catalyst used will ordinarily be between about 0.01% and about 5%, although it is not necessarily limited to this range. In still other cases it may be unnecessary to use any catalyst at all.

Polymerization is usually energized by the application of heat, although both heat and light may be used, and in some cases, light is sufficient. Temperatures between about 60° C. and about 150° C. are preferred, although higher and lower temperatures can be used. The monomeric compounds can be polymerized in the massive state or as dispersions or solutions. Where the dispersion method is employed, it may be desirable to select a dispersing medium insoluble in the catalyst involved. With certain compounds polymerization can be effected in vapor state. Continuous or discontinuous processes may be used. Atmospheric, reduced, or superatmospheric pressures may be used. Polymerization may be carried out under a blanket of an inert gas.

The polymerization reaction can be carried to completion without substantial interruption or it can be stopped at any point short of completion. In the case of resin-forming compounds, incomplete polymerization can be used for the production of a syrup comprising a mixture of monomer and polymer which may be further worked and eventually substantially completely polymerized. The syrup may, for instance, be transferred to a mold of any desired configuration and again subjected to polymerization conditions, or it may be used in coating operations, or in impregnating bibulous, e. g. fibrous, material, which in turn may be used in the production of laminates. Unreacted monomer may be separated from its mixture with polymer by solvent extraction, distillation or other methods. The separated polymer may then be worked up in any known or special manner. In the case of many compounds, particularly in the case of the poylmerization of compounds having two or more non-conjugated polymerizable unsaturated linkages in the molecule, the separated polymer may be capable of further polymerization. Such compounds can be rendered infusible and insoluble in common non-reactive solvents.

Polymers and co-polymers of the invention can be modified by admixture with other synthetic resins, natural resins, cellulose derivatives, and drying oils. Preferred modifiers are film-forming substances. Examples of synthetic resins in addition to polymers of the polymerizable unsaturated organic compounds illustrated hereinabove are alkyd resins, urea-aldehyde resins, phenol-aldehyde resins and synthetic linear super-polyamides and polyester-amides. There may also be present one or more plasticizers, stabilizers, lubricants, dyes, pigments, or fillers. Where the modifiers do not react with, or otherwise adversely affect, the ingredients of the reaction mixture, they may be added to the monomer or to the partially poylmerized material. Where the modifiers are not added to the monomer, they can be incorporated with preformed polymer by grinding, mixing or milling on heated rolls, or by co-precipitation from a common solvent.

Polymers and co-polymers produced in accordance with the invention in general are characterized by excellent color and resistance to the action of physical and chemical agents. Resins can be produced which are clear, water-white, hard and infusible. Many of the polymers possess film-forming properties and adhere well to metal and to many other kinds of surfaces. They can be used as the basis for valuable coating compositions. Most of the solid resinous products of the invention can be used as glass substitutes. Massive castings can be subjected to machine operations. Many of the resins can be used in extrusion, injection molding and compression molding processes.

Some of the many ways in which the invention can be practiced are illustrated by the following examples in which parts are on a weight basis.

Example I

Alloxy acetic acid was produced by the reaction of sodium allylate with chloroacetic acid. Sodium, 92 g., was dissolved in anhydrous allyl alcohol, 835 g. To this solution was added dropwise with stirring a solution of chloroacetic acid, 189 g., in allyl alcohol, 236 g. The mixture was heated to boiling during the addition and the heat was continued for 15 minutes thereafter. 500 cc. of allyl alcohol was removed by distillation under vacuum. 750 cc. of water was added to the residue. Vacuum distillation was then continued until all of the excess allyl alcohol had been removed. The residue was made slightly acid by the addition of concentrated hydrochloric acid. The mixture separated into two liquid phases. The lower (aqueous) phase was extracted with di-isopropyl ether. The ether extracts were combined with the upper phase and the whole was dried over anhydrous sodium sulfate. The ether was removed by volatilization at a low temperature. The residue was flash distilled under reduced pressure. The residue from flash distillation was fractionated under reduced pressure. The alloxy acetic acid obtained had a boiling point of 124° C. to 126° C. under a pressure of 22 mm. of mercury.

Alloxy acetic acid, 129 g., was mixed with vinyl acetate, 775 g., mercuric acetate, 3 g., concentrated sulfuric acid, 0.35 cc., and tannic acid (inhibitor), 1 g. The mixture was refluxed for 1½ hours. The mixture was allowed to stand overnight. 3 g. of sodium acetate was added and low-boiling volatiles flashed off. The vinyl alloxyacetate was distilled and boiled at 78°/28 mm. The compound was a clear, water-white liquid.

Example II

Vinyl alloxy acetate, 100 g., was mixed with benzoyl peroxide, 5 g. The mixture was placed in a glass mold which was sealed and maintained at 65° C. Polymerization occurred. The resulting polymer was a hard, clear, resinous solid, slightly yellow in color.

Example III

Chloroalloxy acetic acid was produced by reacting chloroacetic acid with chloroallyl alcohol in the presence of sodium chloroallylate under anhydrous conditions in accordance with the procedure outlined in Example I.

Chloroalloxy acetic acid, 166 g., is mixed with vinyl acetate, 775 g., mercuric acetate, 3 g., sulfuric acid, 0.35 cc., and tannic acid, 1 g. The mixture is refluxed for 1½ hours. The product obtained is clear, colorless, liquid, vinyl chloroallyloxy acetate.

Example IV

Chloroacetic acid is reacted with crotyl alcohol in the presence of sodium crotylate under anhydrous conditions in accordance with Example I. The resulting crotyloxy acetic acid is reacted with vinyl acetate in the presence of mercuric acetate, sulfuric acid and tannic acid, to form vinyl crotyloxy acetate.

Example V

Vinyl methallyl acetate may be produced by reacting methallyl alcohol with chloroacetic acid to form methalloxyacetic acid, followed by reaction with vinyl acetate.

The term "unsaturated" as used herein refers to carbon-to-carbon aliphatic-type unsaturation. The term "polymerization" refers to polymerization through carbon-to-carbon unsaturation. "Alloxy" is a common abbreviation of "allyloxy" and is synonymous therewith.

We claim as our invention:

1. Vinyl alloxy acetate.
2. Polymeric vinyl alloxy acetate.
3. An ether-ester of a hydroxy saturated monobasic carboxylic acid, which acid has the hydrogen atom of the hydroxy group replaced with the hydrocarbon radical of a beta,gamma-monoolefinic monohydric alcohol containing 3 to 13 carbon atoms and has the hydrogen atom of the carboxylic acid group replaced with the vinyl radical.
4. An ether-ester of a hydroxy saturated aliphatic monobasic carboxylic acid, which acid has the hydrogen atom of the hydroxy group replaced with an alkene-1-yl-3 radical containing 3 to 8 carbon atoms and has the hydrogen atom of the carboxylic acid group replaced with the vinyl radical.
5. A polymer of a hydroxy saturated monobasic carboxylic acid, which acid has the hydrogen atom of the hydroxy group replaced with the hydrocarbon radical of a beta,gamma-monoolefinic monohydric alcohol containing 3 to 13 carbon atoms and has the hydrogen atom of the carboxylic acid group replaced with the vinyl radical.

6. A polymer of a hydroxy saturated aliphatic monobasic carboxylic acid, which acid has the hydrogen atom of the hydroxy group replaced with an alkene-1-yl-3 radical containing 3 to 8 carbon atoms and has the hydrogen atom of the carboxylic acid group replaced with the vinyl radical.

ROBERT S. BARKER.
LYNWOOD N. WHITEHILL.

REFERENCES CITED

The following references are of record in the file of this patent:

UNITED STATES PATENTS

| Number | Name | Date |
| --- | --- | --- |
| 2,221,663 | Rothrock | Nov. 12, 1940 |
| 2,273,891 | Pollack et al. | Feb. 24, 1942 |
| 2,302,618 | Loder | Nov. 17, 1942 |
| 2,386,999 | Adelson et al. | Oct. 16, 1945 |

OTHER REFERENCES

Schriner and Fuson: "Identification of Organic Compounds," Wiley, New York, N. Y. 1940, pages 41 and 43.